March 10, 1931.  E. WILDHABER  1,795,916
PLANETARY TRANSMISSION
Filed Nov. 19, 1927  2 Sheets-Sheet 1
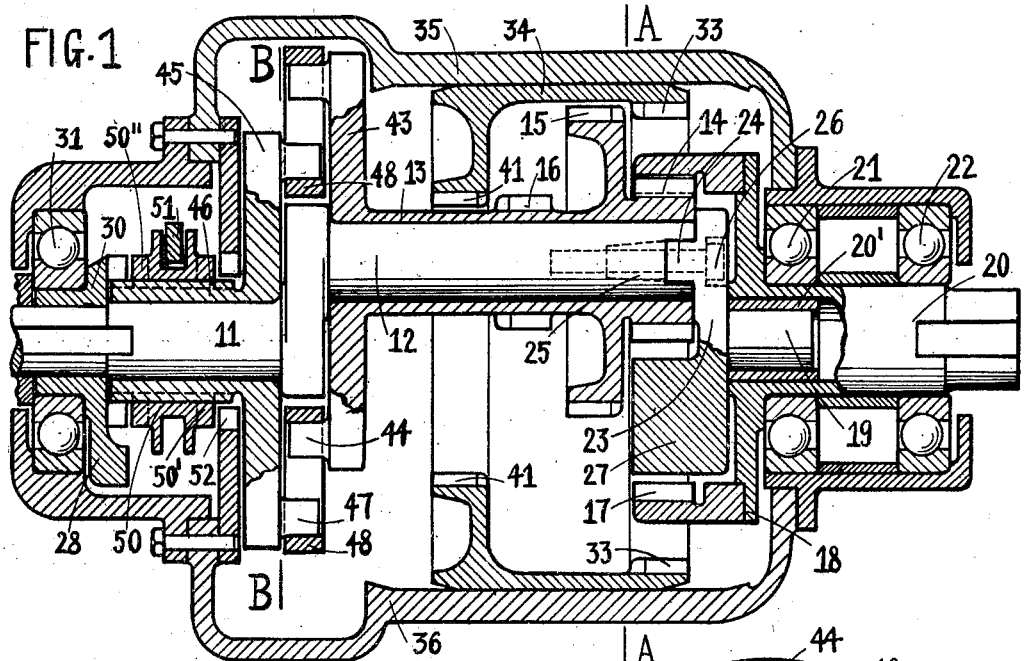
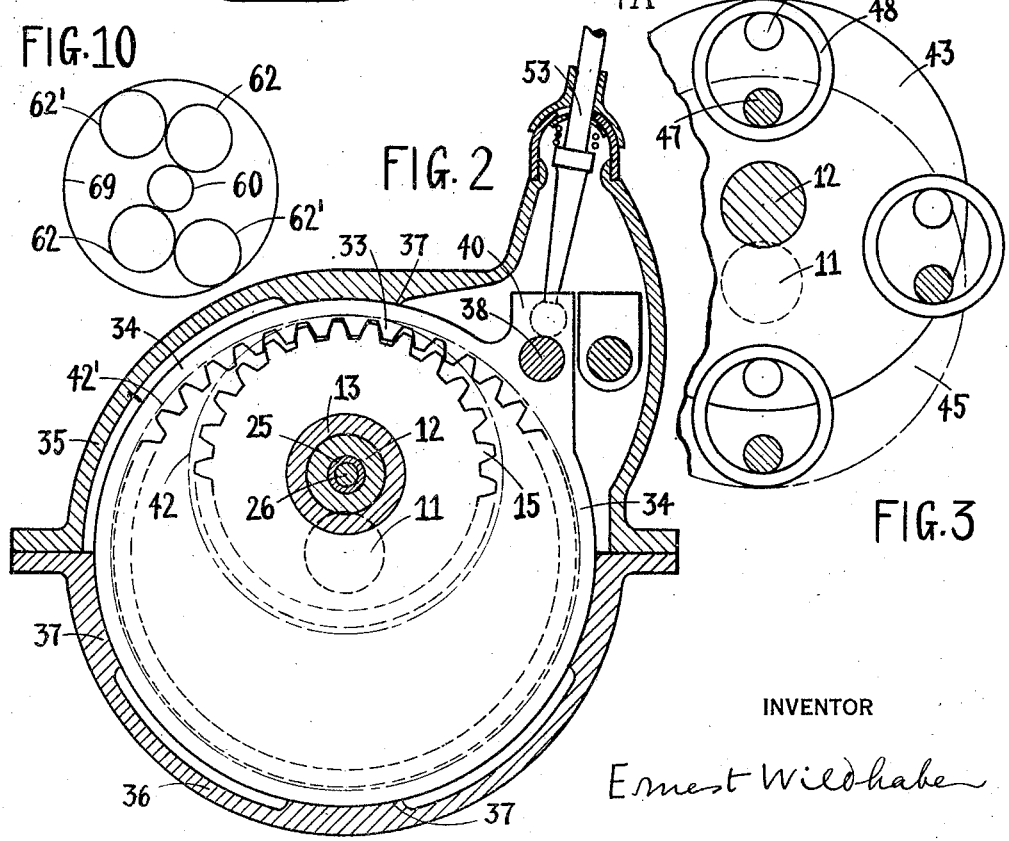
INVENTOR
Ernest Wildhaber

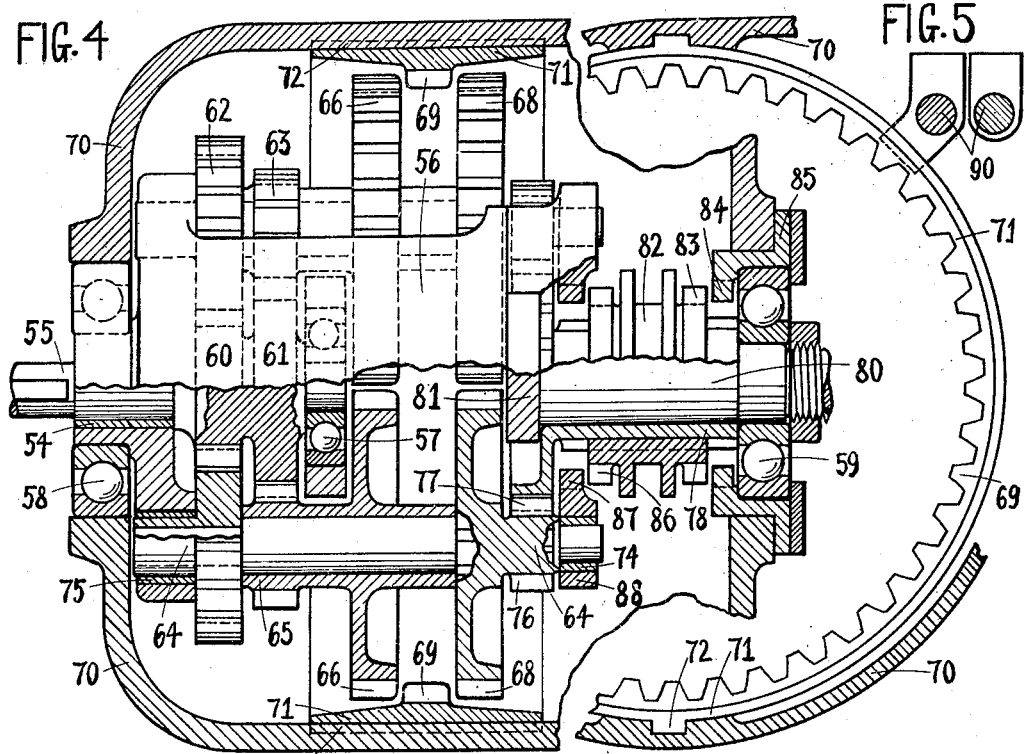
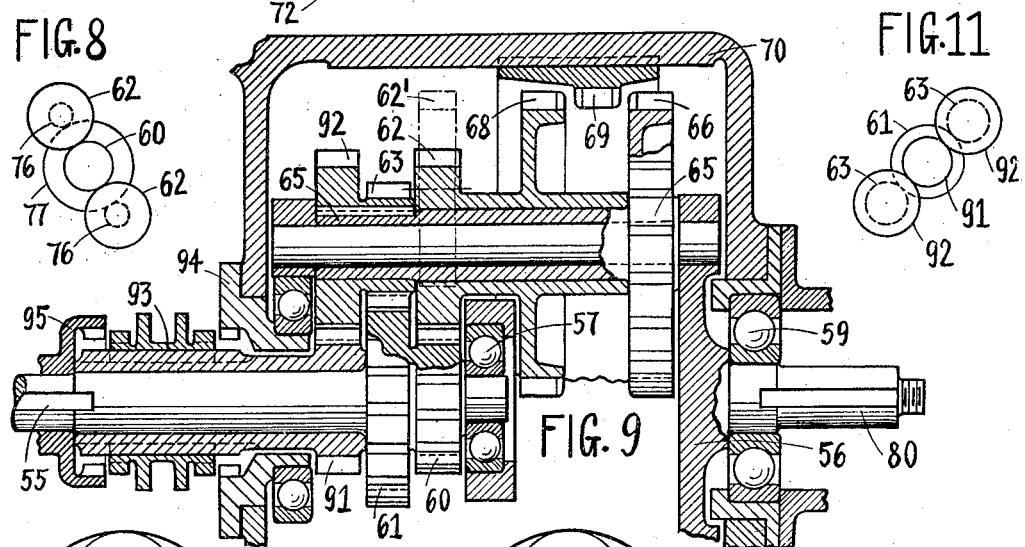
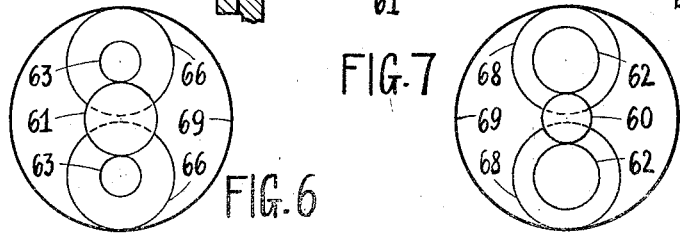

Patented Mar. 10, 1931

1,795,916

UNITED STATES PATENT OFFICE

ERNEST WILDHABER, OF BROOKLYN, NEW YORK

PLANETARY TRANSMISSION

Application filed November 19, 1927. Serial No. 234,418.

The present invention relates to planetary transmissions, and particularly to multiple speed transmissions, such as are used for instance on automobiles, trucks and tractors.

One object of the present invention is to provide a multiple speed transmission of the planetary type of simpler construction than hitherto known.

Planetary transmissions are noted for their advantage of furnishing a direct drive without gear meshing action, that is to say at the forward speed corresponding to a one to one ratio, the whole gearing turns around as a solid unit, without creating noise or friction loss through gear mesh. This advantage is considerable in the automotive applications particularly referred to, inasmuch as direct drive is used most of the time, and the other ratios are needed only occasionally to help out. Planetary transmissions of known structure contain however the drawback of excessive complication, when three or more speeds forward and one reverse speed are desired. Planetary transmissions hitherto provided for automotive requirements were either of the constant mesh type, where the gears remain constantly in engagement, or of a clash gear type in which gears are shifted into and out of mesh along splines of a rotary member. In either case difficulty is experienced in properly journalling the plurality of sun gears provided, and in maintaining said gears stationary when transmitting load.

These difficulties are particularly conspicuous, when internal orbit gears are provided. On the other hand internal gears employed in planetary transmissions generally permit better efficiencies of the transmissions, and moreover call for much smaller tooth loads for transmitting a given torque, as will be explained more fully hereafter.

One chief object of the present invention is to make possible an economical construction of automotive transmissions of the planetary type, in which internal orbit gears are provided and so disposed, that they may be rigidly held and easily put in action, without necessitating complicated and expensive structures. This object is accomplished by providing an internal gear or internal gears which are held in stationary guidances and therefore never perform a revolution on their axis, and which may be shifted in and out of mesh along said guidances. The simplicity of design resulting from axially shifting an otherwise stationary gear, especially a stationary internal gear, will be made fully evident in the course of the specification.

A further aim is to provide novel transmissions of the planetary type made possible and practical through the novel feature of shifting gears which are prevented from turning and which therefore maintain a constant angular relation with respect to the stationary transmission casing.

Another aim is to provide a number of novel transmissions of the planetary type furnishing three or more different speeds.

A still other object is to provide a multiple speed planetary transmission containing a planetary external gear and an internal orbit gear suited to remain stationary and to mesh with said planetary gear in such manner, that pitch circles are embodied, which are of larger diameters than the diameters of the respective tooth zones. In other words a saving on the diameters of the gears may be effected by providing teeth disposed inside of the respective pitch circles, a procedure which has no drawback when applied in the manner set forth.

A further aim is to provide a novel planetary transmission furnishing a plurality of speed reductions, and one speed up ratio, in which latter the driven member turns faster than the driving member.

A still other aim is to provide a planetary transmission furnishing two speed reductions forward and direct drive forward, in which said two speed reductions are obtained with coaxially arranged different planetary gears, which are rotatable relatively to each other.

A further object is to provide a transmission of the above named character, containing an internal gear remaining in constant angular relation relatively to the stationary casing, said gear being axially movable into and out of mesh, the same single internal gear being used for furnishing two speed reductions forward.

Other objects will be apparent in the course of the specification and from recital of the appended claims.

My invention will be explained with reference to the accompanying drawings, in which Fig. 1 is a longitudinal section, partly an inside view, of a planetary transmission embodying my invention.

Fig. 2 is a section along lines A—A of Fig. 1, with gears 15 and 33 in engagement.

Fig. 3 is a section along lines B—B of Fig. 1 and a view of the planet member at the right of lines B—B.

Fig. 4 is a longitudinal section, partly an inside view, of another form of planetary gearing embodying my invention.

Fig. 5 is a partial front view of the internal gear indicated in Fig. 4, and a partial view and section of adjacent parts.

Fig. 6, Fig. 7 and Fig. 8 are diagrams explanatory of the operation of the planetary gear indicated in Fig. 4.

Fig. 9 is a partial longitudinal section of a slightly modified planetary transmission, which furnishes four forward speeds, namely two speed reductions, one direct drive, and a geared up speed.

Fig. 10 and Fig. 11 are diagrams explanatory of the operation of the geared up drive and of the reverse drive respectively of the planetary transmission indicated in Fig. 9.

In Fig. 1 the numeral 11 denotes a drive shaft receiving motion in any known suitable way, such as from a motor and through a clutch disposed adjacent the left end of shaft 11 and omitted in the drawing. Shaft 11 contains an offset portion or crank portion 12, on which a planetary member 13 is rotatably mounted. The latter contains a number of external gears 14, 15, 16 forming part of the planetary member 13 and in the figure shown integral with it. Gear 14 continuously engages an internal gear 17, which is bolted to a disk 18 projecting from the hollow driven shaft 20. This shaft is mounted in two ball bearings 21, 22 and transmits motion through a key to any suitable member (not shown), such as a universal joint, disposed adjacent its right end. Shaft 20 contains a bearing 20' for journalling the projection 19 of a crank arm 23, which is rigidly secured to crank 12. A projection 24 of crank arm 23 fits a recess of crank 12, thus locking said arm against rotation, and a conical projection 25 of said arm fits a tapered hole provided in crank 12. Crank 12 and arm 23 are kept together by a screw bolt 26. This or any other connection is suitable, as long as it secures the arm 23 rigidly to crank 12, so that kinematically, arm 23 and crank 12 are one piece. Arm 23 further contains a counterweight 27. Another counterweight 28 is carried by a part 30, which is keyed to shaft 11 and contains ball bearing 31. The two counterweights 27, 28 serve to partially or to fully balance the eccentric mass of the crank 12 and of its planetary member 13.

The structure and operation relating to low gear and to reverse drive of the transmission will now be explained.

An internal orbit gear 33 is suited to mesh with the external planetary gear 15. Said orbit gear 33 forms part of a drum 34 which leans against the stationary casing 35, 36. The casing is provided with a hollow cylindrical surface fitting drum 34 either on the whole circumference, or in spots 37 (see Fig. 2). Drum 34 is maintained in constant angular relation with respect to the casing, for instance through connection with a shifting rod 38 (Fig. 2) of conventional structure, connection being effected through a projection 40. The shifting rod itself, or its bearings, effect a guidance extending in the direction of the axis of said drum, along which the drum may be shifted without rotation. Internal gear 33 may thus be shifted axially without rotation into mesh and out of mesh with planet 15, and to facilitate shifting the tooth ends are rounded on the clashing sides of gears 15, 33.

Another internal gear 41, which is suited to mesh with planetary gear 16, is rigidly secured to drum 34 or is formed integral with it. The drum is shown in neutral position. When moved to the left (Fig. 1) internal gear 33 engages gear 15, and when the drum is moved to the right, internal gear 41 engages gear 16. During shifting of gears no power is applied to shaft 11, that is to say the clutch is disengaged, in the automotive applications.

When the gears 15 and 33 are in engagement, the external gear 15 rolls on the stationary internal gear in the direction of rotation of shaft 11. Internal gear 17, being of smaller diameter than internal gear 33, is thereby moved slowly in the same direction through its continuous mesh with planetary gear 14. The gear reduction obtained increases with decreasing difference in diameter of the gears 33 and 17, as well known to those familiar with planetary gearing. The proportions indicated in the drawing furnish a reduction of about 1 to 4.

The kinematic action, that is to say the ratio of a pair of gears, is determined by the size of their pitch circles. To save in weight and expense, the tooth zones of internal gearing may be provided inside of the pitch circles, see Fig. 2, where the pitch circles are denoted with the numerals 42 and 42'. Smaller actual gear diameters may thus be arrived at, while maintaining a given offset. This procedure has no ill effect in the case of internal gearing, especially when the pinion (15) is more than half the size of the internal gear. The smaller the difference in diameter is, the less sliding action exists in the various points of a line of action of a gear pair containing an internal gear, and the more the pitch circles loose their significance of being exclusive zones of rolling.

Nevertheless it would be difficult to arrive at a reduction ratio of about 1 to 2 with a gear pair similar to pair 15, 33, because under the conditions indicated in Fig. 1 the diameters would have to be unduly large. Another operative connection between a planet and a stationary member may therefore be resorted to, as will be disclosed hereafter.

Reverse drive is obtained by engaging internal gear 41 with planetary gear 16. The diameter of gear 41 is smaller than the diameter of internal gear 17, and as gear 16 rolls on the stationary internal gear 41, gear 17 receives a reverse motion through its mesh with gear 14.

Intermediate forward drive will now be explained.

Planetary member 13 contains a disk 43 which is provided with pins 44 projecting from its surface at equal intervals and at a constant distance from the center of said planetary member. Another disk 45 of the same character is provided with a hub 46 and is rotatably mounted on shaft 11. It contains pins 47 corresponding to the pins 44 and having the same diameter. Pins 47 are placed at the same equal intervals as pins 44 and at the same distance from the center of disk 45. The pins of the two disks 43, 45 form pairs, which are operatively connected through rings 48.

The operation and relative motion of the two disks may first be considered while crank 12 is stationary. The two disks 43, 45 are then simply two members which turn on fixed and parallel centers. It is seen from consideration of Fig. 3 that the two disks are operatively connected or geared up through the pins 44, 47 and rings 48, so that they turn exactly at a one to one ratio and in the same direction of revolution. The rings 48 thereby roll on the pins 44, 47.

When disk 43 performs a planetary motion about axis 11, the relative motions of the two disks undergo no change and remain the same as for fixed centers. The two disks remain geared up at a one to one ratio.

When disk 45 is maintained stationary, disk 43 and planetary member 13 roll around in a planetary motion, during which disk 43 continuously remains in a parallel position. It performs therefore a motion which is sometimes known under the name of circular parallel motion, or circular translation.

Further information regarding the operative connection between the two disks may be obtained in my copending application entitled Gearing, filed November 10, 1927, Serial No. 232,306.

This peculiar planetary motion is suited in the present case to furnish an intermediate gear ratio of 1 to 2, with the proportions of gears 14, 17 as shown. To effect intermediate forward speed, disk 45 is held stationary.

To effect direct drive, the planetary transmission is locked, for instance by connecting disk 45 with drive shaft 11.

Hub 46 of disk 45 contains splines, along which a clutch member 50 may be shifted in a conventional manner with a fork 51 of known structure, and of which only one side is indicated. When clutch member 50 is shifted to the right, its toothed end 50' engages with a toothed portion of a stationary disk 52, which is bolted to the casing 35, 36. When clutch member 50 is shifted to the left its toothed end 50'' engages teeth of a part 30, which is keyed to shaft 11.

The member 50, as well as drum 34 are shifted with a lever 53 through a known selector mechanism, which permits to shift either member 50 or drum 34, but never both together, and each member only, when the other member is in neutral position.

In reviewing Fig. 1, it is noted that a planetary transmission of simple structure is arrived at, which furnishes the speeds desirable in automobiles while giving direct drive with all gears locked. Moreover when driving through the gears, the planetary member turns on its axis with no excessive number of revolutions.

Another embodiment of my invention is indicated in the Figures 4 and 5, in which, as will be seen, the planet carrier forms part of the driven member, whereas in the former embodiment the planet carrier, namely crank 12, was part of the driving member.

Drive shaft 55 is journalled in the planet carrier 56 by means of a ball bearing 57, and further by means of a bearing 54. The planet carrier forms part of the driven member and is journalled in ball bearings 58, 59.

Drive shaft 55 contains two gears 60, 61 formed integral with it, which mesh with planetary gears 62, 63 respectively. The latter gears form part of different planetary members 64, 65 which are coaxially disposed and free to rotate relatively to each other. In one case of automotive application, the gears 60, 61 are provided respectively with 24 and 40 teeth, and the corresponding planets with 36 and with 20 teeth respectively. Both planetary members contain equal gears 66, 68, having in the instance referred to 58 teeth. An internal orbit gear 69 is angularly fixed to the stationary casing 70, and may be shifted into mesh and again out of mesh with either the planetary gear 66 or planetary gear 68. Internal gear 69 possesses 118 teeth in the instance referred to. It forms part of a drum 71 which is held in the stationary casing 70, and which is provided with splines 72 engaging slots of casing 70. These slots extend in the direction of the axis of the gear 69 and form guidances for shifting gear 69 axially into mesh, while maintaining it angularly fixed or angularly stationary.

The above remarks refer to a structure, in which internal gear 69 is provided with straight teeth extending in the direction of its axis. When helical teeth are provided, I preferably use also helical splines (72), which moreover have the same lead as the helical teeth. In other words the inclination of the splines is such, that a complete revolution of them corresponds to the same axial distance as a complete revolution of the teeth. Moreover the hand of teeth and splines is made the same. The pressure exerted upon the teeth of the internal gear when transmitting power then has no tendency to either push the internal gear out of mesh or to further draw it in.

Intermediate gear ratio is obtained by shifting internal gear 69 to the left, so that mesh is established between gears 66, 69, gear 66 rolling on the stationary internal gear 69. In the example above referred to, the reduction ratio is then approximately 1 to 2. Low gear ratio is effected by shifting internal gear 69 to the right, into mesh with planetary gear 68, so that the latter rolls on the stationary internal gear 69. In the example above referred to the ratio is then approximately 1 to 4.

The action of the transmission at intermediate and at low gear is further explained through the diagrams Fig. 6 and Fig. 7, which indicate the gears merely by their pitch circles. In intermediate gear the driver 61 imparts motion to the planetary gears 63, and the planetary gears 66, which are rigidly secured to gears 63, roll in stationary internal gear 69, see Fig. 6. In low gear the driver 60 imparts motion to the planetary gears 62, and the planetary gears 68, which are rigidly secured to planetary gears 62, roll in the stationary internal gear 69, see Fig. 7.

It is noted that the same internal gear is used for effecting intermediate and low forward drive.

The planetary member 64 is journalled in two bearings 74, 75 provided in the planet carrier, which latter is composed of such a number of parts as will facilitate assembly. Bearing 75 holds the hub of planet 62, which is rigidly secured to member 64.

Adjacent bearing 74, member 64 contains an external gear 76, which meshes with an external sun gear 77 having a long hub 78. It is rotatably mounted on shaft 80 which forms part of the planet carrier 56, to which shaft 80 is bolted through arms 81. Hub 78 is provided with splines, along which a clutch member 82 may be axially shifted in known manner. When shifted to the right, external teeth 83 provided on said clutch member will engage internal teeth 84 of a stationary part 85, which also serves as support for the ball bearing 59, and which is bolted to the stationary casing. When clutch member 82 is shifted to the left, its teeth 86 will engage internal teeth 87 provided in part 88 of the planet carrier 56. Gear 77 is then connected with the planet carrier, and the transmission is thereby locked, and will rotate as a unit, thereby effecting direct drive.

The action at reverse drive will now be explained with reference to the diagram Fig. 8. The driver 60 applies motion to planetary gears 62, with which the planetary gears 76 are rigidly connected. These latter roll on sun gear 77 maintained stationary through engagement of clutch member 82 with part 85. The diameter of sun gear 77 is considerably larger than the diameter of the driver 60, so that reverse motion is effected.

Gear shifting may be effected in the customary manner, through the usual selector mechanism comprising shifting rods 90.

The transmission indicated in the Figures 4 and 5 is capable of three forward speeds and one reverse speed, and is operated as simply as present transmissions of the fixed center type. Aside of the advantage of having no gears turning relatively to one another when direct drive is used, the shown form of planetary transmissions also operates with smaller tooth loads. Considering for instance intermediate gear ratio, which is next to direct drive in importance, it is seen that the driver 61 is comparatively large, and that therefore the tooth load effected by the engine torque is comparatively small. The tooth load exerted on gear 66 through stationary internal gear 69 is still smaller, because the torque created by said tooth load on the gear 66 must balance the torque exerted through driver 61 on the much smaller planetary gear 63. The amount of the actual tooth load is moreover only one half or one third of the tooth load determined for single planetary gears, depending on whether two or three identical pairs of planetary members are provided. Preferably I provide two pairs of planetary members, but in some instances may provide individual planetary members only. In this case the two members 64, 65 would be journalled on different centers, and some structural simplification could be arrived at.

The transmission indicated in Fig. 9 resembles the transmission shown in Fig. 4, but provides four forward speeds and one reverse. Gears performing the same function are denoted with the same numerals as in Fig. 4. Intermediate and low forward speeds are obtained in exactly the same manner. reverse speed will now be explained with reference to Fig. 10. The driver 60 transmits motion to planetary gear 62 which meshes with another planetary gear 62' having a different center. Gear 62' is indicated in Fig. 9 in dot and dash lines. When internal gear 69 is shifted to the left (Fig. 9) a sufficient amount, gear 62' and gear 69 will mesh with each other, and gear 62' then rolls on the stationary internal gear 69. The latter is angularly fixed to the stationary casing of the transmission, and axially movable along splines, in the same manner as described with reference to gear 69 of Fig. 4 and Fig. 5.

A forward drive at a speed higher than engine speed may be obtained by holding external gear 91 stationary. The latter meshes with planetary gear 92, which is rigidly secured to planetary member 65. The driver 61 (see Fig. 11) applies motion to the planetary gear 63, and planetary gear 92 which is rigidly connected with it rolls then on the stationary gear 91, thereby effecting a rotation of the planet carrier which is faster than the rotation of driver 61.

Gear 91 is maintained in constant mesh with planetary gear 92, and may be held stationary by means of a clutch member 93 which is movable along splines of gear 91. When clutch member 93 is shifted to the right, its teeth engage the teeth of stationary part 94, thereby holding gear 91 stationary. And when clutch member 93 is shifted to the left, its teeth engage teeth of a part 95 which is keyed to the drive shaft 55. The planetary mechanism is thereby locked and direct drive is effected.

Many further modifications may be made in my invention, without departing from its spirit. For definition of its scope it is relied upon the annexed claims.

What I claim and desire to secure by Letters Patent is:

1. A planetary transmission, comprising a driving member and a coaxial driven member, concentric planetary gears mounted on one of said coaxial members, said concentric planetary gears being geared at different ratios with the other of said coaxial members, a hollow member in permanent positive connection with a stationary casing and containing internal gear teeth, two concentric planetary gears of different axial position being suited to mesh with said teeth, and means for axially shifting said hollow member to one side into mesh with one of said two gears and to the other side into mesh with the other of said two gears.

2. A planetary transmission, comprising a driving member and a coaxial driven member, two different planetary members provided with gear teeth and mounted on one of said coaxial members, said two planetary members being geared at different ratios with the other of said coaxial members, a hollow member in permanent positive connection with a stationary casing, said hollow member containing internal gear teeth suited to mesh selectively with the gear teeth of said two planetary members, and means for axially shifting said hollow member to one side into mesh with one of said planetary members and to the other side into mesh with the other of said planetary members.

3. A planetary transmission, containing a driving member and a coaxial driven member, a planet carrier connected with one of said members, the two sun gears of different axial positions connected with the other of said members, planetary gears mounted on said planet carrier and meshing with said sun gears, a hollow member in permanent positive connection with a stationary casing, said hollow member containing internal gear teeth suited to mesh with planetary gears of different axial position, means for axially shifting said hollow member to one side into internal mesh with planetary gears to effect low gear and to the other side into internal mesh with other planetary gears to effect an intermediate gear reduction, a further sun gear maintained in constant mesh with planetary gears, and means for connecting said sun gear selectively with the stationary casing and with a rotary member of the transmission for effecting reverse drive and direct drive respectively.

4. An automotive transmission, containing a planet carrier, planetary gears mounted on said planet carrier, a plurality of sun gears rigidly connected with each other and meshing with said planetary gears, an internal orbit gear in constant connection with a stationary casing, means for effecting and disrupting mesh between said orbit gear and a planetary gear, another sun gear maintained in constant mesh with a planetary gear, and means for selectively connecting said other sun gear with the stationary casing and with a rotary member of the transmission, for effecting reverse drive and direct drive respectively.

5. An automotive transmission, containing a planet carrier, planetary gears mounted on said planet carrier, a plurality of sun gears rigidly connected with each other and meshing with said planetary gears, an internal orbit gear maintained in constant positive connection with a stationary casing, means for shifting said orbit gear axially to one side and to the other side into mesh with different planetary gears respectively, another sun gear maintained in constant mesh with a planetary gear, and means for positively connecting said sun gear selectively with the stationary casing and with a rotary member of the transmission, for effecting reverse drive and direct drive respectively.

6. A planetary transmission, comprising a driving member and a coaxial driven member, two planetary members journalled on the driven member and provided with gear teeth, said planetary members being geared at different ratios with the driving member, an angularly stationary internal orbit gear suited to mesh with both planetary members, at least one of said planetary members containing different rows of teeth for engagement with said driving member and for engagement with said internal orbit gear respectively, and means for axially shifting said internal orbit gear from a neutral position to one side into mesh with one of said planetary members and to the other side into mesh with the other of said planetary members.

7. A planetary transmission, comprising a driving member and a coaxial driven member, two coaxial planetary members journalled on the driven member and provided with gear teeth, said planetary members being geared at different ratios with the driving member, an internal orbit gear in permanent positive connection with a stationary casing and suited to mesh with both of said planetary members, at least one of said planetary members containing different rows of teeth for engagement with said driving member and for engagement with said internal orbit gear respectively, and means for shifting said internal orbit gear from a neutral position to one side into mesh with one of said planetary members and to the other side into mesh with the other of said planetary members.

8. A planetary transmission, comprising a driving member and a coaxial driven member, a stationary element, two planetary members journalled on one of said coaxial members and provided with gear teeth, said planetary members being geared up with the other of said coaxial members, an internal orbit gear maintained in permanent positive connection with said stationary element and suited to mesh with both planetary members, at least one of said planetary members containing different rows of teeth for engagement with said other member and for engagement with said internal orbit gear respectively, and means for shifting said internal orbit gear from a neutral position to one side into mesh with one of said planetary members and to the other side into mesh with the other of said planetary members.

9. A planetary transmission, comprising a driving member and a coaxial driven member, a stationary element, two planetary members journalled on said driven member, said planetary members being geared up with said driving member, an internal orbit gear maintained in permanent positive connection with said stationary element and suited to mesh with both planetary members, at least one of said planetary members containing different rows of teeth for engagement with said driving member and for engagement with said internal orbit gear respectively, and means for shifting said internal orbit gear from a neutral position to one side into mesh with one of said planetary members and to the other side into mesh with the other of said planetary members.

10. A planetary transmission, comprising a driving member and a coaxial driven member, a stationary element, two planetary members journalled on one of said coaxial members and geared at different ratios with the other of said coaxial members, a hollow member maintained in positive engagement with said stationary element, said hollow member containing gear teeth and being suited to mesh with both planetary members, at least one of said planetary members containing different rows of teeth for engagement with said other member and for engagement with said hollow member respectively, and means for shifting said hollow members from a neutral position to one side into mesh with one of said planetary members and to the other side into mesh with the other of said planetary members.

11. A planetary transmission, comprising a driving member and a coaxial driven member, a stationary element, two planetary members journalled on the driven member and geared at different ratios with the driving member, a hollow member maintained in positive engagement with said stationary element, said hollow member containing internal gear teeth and being suited to mesh selectively with both planetary members, at least one of said planetary members containing different rows of teeth for engagement with said driving member and for engagement with said hollow member respectively, and means for shifting said hollow member from a neutral position to one side into mesh with one of said planetary members and to the other side into mesh with the other of said planetary members.

12. In a planetary transmission, comprising a driving member and a coaxial driven member, planetary gears journalled on one of said coaxial members, a sun gear forming part of the other of said coaxial members, an internal orbit gear in permanent positive connection with a stationary casing, said internal orbit gear being suited to mesh selectively with said planetary gears, another planetary gear connected with one of said planetary gears and meshing with said sun gear, and means for shifting said internal orbit gear from a neutral postion into selective mesh with said planetary gears.

ERNEST WILDHABER.